United States Patent
Ho et al.

(10) Patent No.: US 9,957,108 B2
(45) Date of Patent: May 1, 2018

(54) CONVEYOR TRANSITION FOR MATERIAL HANDLING

(71) Applicant: Continental Intermodal Group—Trucking LLC, Ft. Worth, TX (US)

(72) Inventors: Dennis Keith Ho, Abbotsford (CA); Kevin Brent Thiessen, Rosedale (CA)

(73) Assignee: Continental Intermodal Group-Trucking LLC, Ft. Worth, TX (US)

( * ) Notice: Subject to any disclaimer, the term of this patent is extended or adjusted under 35 U.S.C. 154(b) by 0 days. days.

(21) Appl. No.: 15/176,002

(22) Filed: Jun. 7, 2016

(65) Prior Publication Data

US 2016/0355345 A1    Dec. 8, 2016

Related U.S. Application Data

(60) Provisional application No. 62/172,558, filed on Jun. 8, 2015.

(51) Int. Cl.
*B65G 21/08*    (2006.01)
*B65G 11/12*    (2006.01)
(Continued)

(52) U.S. Cl.
CPC .......... *B65G 11/126* (2013.01); *B65G 11/206* (2013.01); *B65G 47/20* (2013.01);
(Continued)

(58) Field of Classification Search
CPC ............... B65G 11/126; B65G 11/206; B65G 2201/042
(Continued)

(56) References Cited

U.S. PATENT DOCUMENTS

| 1,346,990 A | 7/1920 | Lee |
| 2,124,687 A | 7/1938 | Carson |

(Continued)

FOREIGN PATENT DOCUMENTS

| DE | 4235276 A1 | 4/1994 |
| DE | 4432713 A1 | 3/1996 |

(Continued)

OTHER PUBLICATIONS

U.S. Appl. No. 12/909,357; Notice of Allowance; dated Sep. 24, 2014; 7 pages.

(Continued)

*Primary Examiner* — Douglas A Hess
(74) *Attorney, Agent, or Firm* — Lathrop Gage L.L.P.

(57) ABSTRACT

An assembly for directing bulk material from an upper conveyor to a lower conveyor is provided. The conveyors are relatively rotatable in yaw and the lower conveyor is pivotable in pitch. The assembly includes an upper hood portion, a vertical flow cone, and a bottom containment assembly. The upper hood portion redirects material from the upper conveyor downward through an exit aperture. The vertical flow cone underneath the upper hood portion is rotatable in yaw relative to the upper hood portion and is movable vertically relative to the upper hood portion. The vertical flow cone directs the bulk material from the exit aperture toward the lower conveyor. The bottom containment assembly is mounted to the lower conveyor, is movable lengthwise relative to the lower conveyor, is pivotable and movable vertically relative to the upper hood portion, and includes an aperture for receiving the material.

22 Claims, 9 Drawing Sheets

(51) Int. Cl.
   *B65G 11/20* (2006.01)
   *B65G 47/20* (2006.01)
   *B65G 47/44* (2006.01)

(52) U.S. Cl.
   CPC ........ *B65G 47/44* (2013.01); *B65G 2201/042* (2013.01); *B65G 2201/045* (2013.01)

(58) Field of Classification Search
   USPC .................. 198/317, 318, 526, 528, 529
   See application file for complete search history.

(56) References Cited

U.S. PATENT DOCUMENTS

| | | | |
|---|---|---|---|
| 2,737,885 A | 3/1956 | Ernest et al. | |
| 3,086,465 A | 4/1963 | De Montfort | |
| 3,095,097 A | 6/1963 | Mellow | |
| 3,231,066 A | 1/1966 | Harrison et al. | |
| 3,265,232 A | 8/1966 | Frank | |
| 3,285,439 A | 11/1966 | Harverson | |
| 3,310,161 A | 3/1967 | Kraft, Jr. | |
| 3,314,557 A | 4/1967 | Sackett, Sr. | |
| 3,356,268 A | 12/1967 | Swanson | |
| 3,501,193 A | 3/1970 | Gray | |
| 3,530,832 A | 9/1970 | Satnick | |
| 3,542,187 A | 11/1970 | Assauer | |
| 3,567,048 A | 3/1971 | Whitham | |
| 3,575,306 A * | 4/1971 | Obermeyer ........... E01C 19/203 | |
| | | | 198/313 |
| 3,653,486 A | 4/1972 | McLean et al. | |
| 3,669,245 A | 6/1972 | Wooten et al. | |
| 3,753,506 A | 8/1973 | Palmer | |
| 3,884,346 A | 5/1975 | O'Neill et al. | |
| 3,899,037 A | 8/1975 | Yuker | |
| 3,934,739 A | 1/1976 | Zumsteg et al. | |
| 4,101,019 A | 7/1978 | Satterwhite | |
| 4,187,047 A | 2/1980 | Squifflet | |
| 4,198,186 A | 4/1980 | Holdren et al. | |
| 4,268,208 A | 5/1981 | Hankins et al. | |
| 4,309,808 A | 1/1982 | Dean et al. | |
| 4,319,677 A | 3/1982 | Kipper | |
| 4,330,232 A | 5/1982 | McClaren | |
| 4,337,014 A | 6/1982 | Farnham | |
| 4,345,869 A | 8/1982 | King | |
| 4,387,798 A | 6/1983 | Jamison et al. | |
| 4,392,776 A | 7/1983 | Shum | |
| 4,465,420 A | 8/1984 | Dillman | |
| 4,482,281 A | 11/1984 | Musil | |
| 4,491,216 A | 1/1985 | Sawby | |
| 4,561,821 A | 12/1985 | Dillman | |
| 4,568,239 A | 2/1986 | Sims | |
| 4,624,357 A | 11/1986 | Oury et al. | |
| 4,629,060 A | 12/1986 | Schlegel et al. | |
| 4,701,095 A | 10/1987 | Berryman et al. | |
| 4,813,526 A | 3/1989 | Belanger | |
| 4,917,560 A | 4/1990 | Murray et al. | |
| 4,924,993 A | 5/1990 | Buxton | |
| 4,944,646 A | 7/1990 | Edwards et al. | |
| 5,087,155 A | 2/1992 | Herman et al. | |
| 5,125,771 A | 6/1992 | Herman et al. | |
| 5,129,506 A | 7/1992 | Gutov et al. | |
| 5,129,508 A | 7/1992 | Shelstad | |
| 5,141,528 A | 8/1992 | Boczkiewicz et al. | |
| 5,203,442 A | 4/1993 | Oury et al. | |
| 5,203,628 A | 4/1993 | Hamm | |
| 5,234,094 A * | 8/1993 | Weyermann ........... B65G 65/28 | |
| | | | 198/303 |
| 5,277,489 A | 1/1994 | Hamm | |
| 5,297,665 A | 3/1994 | Smith | |
| 5,339,996 A | 8/1994 | Dubbert et al. | |
| 5,340,259 A | 8/1994 | Flaskey | |
| 5,427,497 A | 6/1995 | Dillman | |
| 5,431,523 A | 7/1995 | Ferguson | |
| 5,573,363 A * | 11/1996 | Rohr ................. B63B 27/22 | |
| | | | 414/138.7 |
| 5,577,618 A | 11/1996 | Rafferty | |
| 5,634,716 A | 6/1997 | Westall et al. | |
| 5,640,996 A | 6/1997 | Schlecht et al. | |
| 5,682,977 A | 11/1997 | White | |
| 5,865,300 A | 2/1999 | Newsome | |
| 6,135,171 A | 10/2000 | Weakly et al. | |
| 6,186,311 B1 | 2/2001 | Conner | |
| 6,186,654 B1 | 2/2001 | Gunteret et al. | |
| 6,283,269 B1 | 9/2001 | Mayer | |
| 6,293,689 B1 | 9/2001 | Guntert et al. | |
| 6,296,435 B1 * | 10/2001 | Wood .................. B60P 1/42 | |
| | | | 198/536 |
| 6,360,876 B1 | 3/2002 | Nohl et al. | |
| 6,367,610 B1 | 4/2002 | Fortenbery et al. | |
| 6,378,686 B1 | 4/2002 | Mayer et al. | |
| 6,386,352 B1 | 5/2002 | Baker et al. | |
| 6,527,428 B2 | 3/2003 | Guntert et al. | |
| 6,540,039 B1 | 4/2003 | Yu et al. | |
| 6,543,622 B1 | 4/2003 | Fridman | |
| 6,688,450 B2 | 2/2004 | Speers et al. | |
| 6,810,976 B2 | 11/2004 | Rohrs | |
| 6,827,198 B1 | 12/2004 | Costanzo | |
| 6,866,071 B2 | 3/2005 | Fischer | |
| 6,910,586 B2 | 6/2005 | McCloskey | |
| 6,929,113 B1 | 8/2005 | Hoover et al. | |
| 6,986,294 B2 | 1/2006 | Fromme et al. | |
| 7,150,352 B2 | 12/2006 | Cotter et al. | |
| 7,198,278 B2 | 4/2007 | Donaldson | |
| 7,223,059 B2 | 5/2007 | Smith et al. | |
| 7,255,194 B2 | 8/2007 | Lim et al. | |
| 7,296,676 B2 | 11/2007 | Smith et al. | |
| 7,644,816 B2 * | 1/2010 | Veiga Leal ........ A01D 41/1217 | |
| | | | 193/22 |
| 7,789,217 B2 | 9/2010 | Fischer et al. | |
| 7,887,110 B2 | 2/2011 | Cheng et al. | |
| 7,946,416 B2 * | 5/2011 | Grose .................... B65G 33/24 | |
| | | | 198/312 |
| 7,971,702 B2 * | 7/2011 | Johnsgaard ........... B65G 65/46 | |
| | | | 198/550.1 |
| 8,025,140 B2 | 9/2011 | Whyte et al. | |
| 8,033,376 B2 | 10/2011 | Toews et al. | |
| 8,186,502 B2 | 5/2012 | Mackin et al. | |
| 8,251,199 B2 | 8/2012 | Tebbe et al. | |
| 8,322,507 B2 | 12/2012 | Demong et al. | |
| 8,348,044 B2 | 1/2013 | Tebbe et al. | |
| 8,408,377 B2 | 4/2013 | Werlinger | |
| 8,640,855 B2 | 2/2014 | Brobst | |
| 8,662,285 B2 * | 3/2014 | Jesse ................... B65G 33/24 | |
| | | | 198/300 |
| 8,752,694 B2 * | 6/2014 | Putman .................. B65G 41/00 | |
| | | | 198/311 |
| 8,875,864 B2 * | 11/2014 | Emerson ............... B65G 41/008 | |
| | | | 198/300 |
| 8,944,239 B2 | 2/2015 | Campbell et al. | |
| 8,944,740 B2 | 2/2015 | Teichrob et al. | |
| 9,038,814 B2 * | 5/2015 | Linde .................. A01D 41/1217 | |
| | | | 198/671 |
| 9,079,470 B2 | 7/2015 | Slawson | |
| 9,174,804 B2 * | 11/2015 | Sivinski | |
| 9,334,124 B2 | 5/2016 | Teichrob et al. | |
| 9,392,742 B2 * | 7/2016 | Boston ................... A01C 7/208 | |
| 9,428,348 B2 | 8/2016 | Teichrob et al. | |
| 9,487,362 B2 * | 11/2016 | Dismuke, Sr. ........ B65G 33/24 | |
| 9,499,348 B2 | 11/2016 | Teichrob et al. | |
| 9,604,785 B1 * | 3/2017 | Gaerke ................ B65G 11/146 | |
| 9,643,789 B2 | 5/2017 | Teichrob et al. | |
| 9,676,554 B2 * | 6/2017 | Glynn .................... E21B 21/02 | |
| 9,723,789 B2 * | 8/2017 | Van Mill ................ A01D 90/10 | |
| 2007/0029170 A1 | 2/2007 | Anagnost | |
| 2007/0193798 A1 | 8/2007 | Allard et al. | |
| 2008/0008562 A1 | 1/2008 | Beckel et al. | |
| 2008/0179054 A1 | 7/2008 | McGough et al. | |
| 2009/0078410 A1 | 3/2009 | Krenek et al. | |
| 2010/0008750 A1 | 1/2010 | Jones | |
| 2013/0062169 A1 | 3/2013 | Johannsen | |
| 2013/0118862 A1 | 5/2013 | Stewart et al. | |
| 2014/0023467 A1 | 1/2014 | Begley et al. | |

(56) References Cited

U.S. PATENT DOCUMENTS

| | | |
|---|---|---|
| 2014/0110229 A1 | 4/2014 | Jorgensen et al. |
| 2015/0044004 A1 | 2/2015 | Pham et al. |
| 2016/0355348 A1 | 12/2016 | Ho et al. |

FOREIGN PATENT DOCUMENTS

| | | |
|---|---|---|
| EP | 0593985 A2 | 4/1994 |
| GB | 2222995 A | 3/1990 |
| WO | WO 1999/050091 A1 | 10/1999 |

OTHER PUBLICATIONS

U.S. Appl. No. 13/452,422; Notice of Allowance; dated May 24, 2016; 9 pages.
U.S. Appl. No. 14/286,488; Notice of Allowance; dated Jul. 27, 2016; 8 pages.
U.S. Appl. No. 14/945,944; Notice of Allowance; dated Feb. 1, 2016; 8 pages.
U.S. Appl. No. 14/732,928; Notice of Allowance; dated Jan. 10, 2017; 5 pages.
U.S. Appl. No. 15/176,815; Notice of Allowance; dated Aug. 9, 2017; 7 pages.
U.S. Appl. No. 12/909,357; Non-Final Office Action; dated Sep. 20, 2013; 6 pages.
U.S. Appl. No. 12/909,357; Non-Final Office Action; dated Feb. 27, 2014; 11 pages.
U.S. Appl. No. 12/909,357; Final Office Action; dated Jul. 31, 2014; 9 pages.
U.S. Appl. No. 13/452,422; Non-Final Office Action; dated Mar. 13, 2015; 14 pages.
U.S. Appl. No. 13/452,422; Final Office Action; dated Sep. 18, 2015; 16 pages.
U.S. Appl. No. 13/452,422; Non-Final Office Action; dated Dec. 30, 2015; 17 pages.
U.S. Appl. No. 14/286,488; Non-Final Office Action; dated Sep. 4, 2015; 6 pages.
U.S. Appl. No. 14/286,488; Non-Final Office Action; dated Jan. 19, 2016; 14 pages.
U.S. Appl. No. 14/732,928; Non-Final Office Action; dated Aug. 11, 2016; 14 pages.
https://www.youtube.com/watch?v=FFEcn2HX2WY; Superior RazerTail Truck Unloader Promotional Video; Superior Industries; accessed Oct. 12, 2017; 3 pages.
U.S. Appl. No. 15/176,815; Non-Final Office Action; dated Feb. 24, 2017.
"Sand Silos Sites"; FB Industries; Nov. 2010; 4 pages.
"Pro-Belt Horizontal Curve Design"; http://www.pro-belt.com/hcurve.htm; accessed Oct. 1, 2015; 3 pages.
"Dual-Direction Discharge Conveyor"; http://www.cisco-eagle.com/catalog/c-4220-dual-direction-tilting-discharge-belt-conveyor.aspx; Cisco-Eagle; 2015; accessed Oct. 1, 2015; 2 pages.
"Vertical Conveying Solutions"; http://www.rvson.com/; accessed Oct. 1, 2015; 6 pages.
https://www.youtube.com/watch?v=WmnUqC6OaJw; Superior TeleStacker Conveyor Promotional Video; Superior Industries; accessed Oct. 12, 2017; 3 pages.

\* cited by examiner

CONVEYOR TRANSITION FOR MATERIAL HANDLING

CROSS-REFERENCE TO RELATED APPLICATIONS

This application claims the benefit and priority of U.S. Provisional Application 62/172,558 filed Jun. 8, 2015. The foregoing application is incorporated by reference herein in its entirety.

FIELD OF THE INVENTION

The present invention pertains in general to bulk material handling systems and in particular to systems for moving bulk granular material from one conveyor to another.

BACKGROUND

Granular material, such as sand or hydraulic fracturing proppant, is used in bulk quantity in a number of applications. For example, in hydraulic fracturing operations by oil and gas and other industries, fracturing fluid, along with a granular proppant material such as sand and/or ceramics, is pumped into a drill well to create and prop open fractures in rock. Often, activities requiring large amounts of granular material are performed in a remote location, requiring granular material to be shipped in for example by road, rail or water. For such activities, it is desirable to have sufficient and often large amounts of granular material readily available for adequately reliably carrying out operations.

One component of an on-site mobile granular material delivery system is a mobile conveyor, which receives the material from a source such as a delivery truck, barge or rail car and conveys the material to an elevated location such as the input of a storage container. The mobile conveyor may be provided in the form factor of a vehicle including multiple re-orientable and telescoping conveyors. Often, it is required to use two or more conveyors operated in series to move the material. The two conveyors may potentially be oriented differently, for example in the yaw and pitch directions. In such configurations there is a change in velocity as the material transitions from one conveyor to another, which can be problematic. Further, during transition of the material between conveyors, material can be lost and dust can be produced, which can lead to a significant health hazard due to the potential for silicosis.

Therefore there is a need for a conveyor transition for bulk material handling that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an apparatus for directing the transition of bulk material from an upper conveyor to a lower conveyor. In accordance with an aspect of the present invention, there is provided a material transition assembly for directing bulk material from an upper conveyor to a lower conveyor, the upper conveyor and lower conveyor being relatively rotatable in yaw and the lower conveyor being pivotable in pitch, the material transition assembly comprising: a lower redirection member rotatable in yaw and movable vertically relative to the upper conveyor, the lower redirection member configured to receive and redirect the bulk material from the upper conveyor; and a bottom containment assembly movable lengthwise relative to the lower conveyor, the bottom containment assembly pivotable in pitch with the lower conveyor, the bottom containment assembly including an aperture formed therein for passing the bulk material from the lower redirection member to the lower conveyor.

In accordance with another aspect of the present invention, there is provided a material transition assembly for directing bulk material from an upper conveyor to a lower conveyor, the upper conveyor and lower conveyor being relatively rotatable in yaw and the lower conveyor being pivotable in pitch, the material transition assembly comprising: an upper hood portion configured to receive the bulk material from the upper conveyor and to redirect the bulk material downward; a lower redirection member disposed underneath the upper hood portion, the lower redirection member being rotatable in yaw relative to the upper hood portion and being movable vertically relative to the upper hood portion, the lower redirection member configured to receive and redirect the bulk material from the upper hood portion; and a bottom containment assembly movable lengthwise relative to the lower conveyor, the bottom containment assembly pivotable in pitch and movable in position vertically relative to the upper hood portion, the bottom containment assembly including an aperture formed therein for passing the bulk material from the lower redirection member to the lower conveyor. The bottom containment assembly may be mounted to the lower conveyor.

In accordance with another aspect of the present invention, there is provided a method for directing bulk material from an upper conveyor to a lower conveyor, the upper conveyor and lower conveyor being relatively rotatable in yaw and the lower conveyor being pivotable in pitch, the method comprising: receiving the bulk material at a lower redirection member disposed lower than the upper conveyor, the lower redirection member being rotatable in yaw and movable vertically relative to the upper conveyor; redirecting the bulk material using the lower redirection member toward an aperture formed in a lower redirection member; receiving the bulk material through the aperture in the bottom containment assembly; and containing the bulk material adjacent to the lower conveyor using the bottom containment assembly.

In accordance with another aspect of the present invention, there is provided method for directing bulk material from an upper conveyor to a lower conveyor, the upper conveyor and lower conveyor being relatively rotatable in yaw and the lower conveyor being pivotable in pitch, the method comprising: receiving the bulk material within an upper hood portion defining a channel for the bulk material; redirecting the bulk material downward within the upper hood portion; receiving the bulk material from the upper hood portion at a lower redirection member disposed underneath the upper hood portion, the lower redirection member being rotatable in yaw and movable vertically relative to the upper hood portion; redirecting the bulk material using the lower redirection member toward an aperture formed in a lower redirection member; receiving the bulk material through the aperture in the bottom containment assembly; and containing the bulk material adjacent to the lower conveyor using the bottom containment assembly.

In accordance with another aspect of the present invention, there is provided a material transition assembly for directing bulk material from an upper conveyor to a lower conveyor, the upper conveyor and lower conveyor being relatively rotatable in yaw and the lower conveyor being pivotable in pitch, the material transition assembly comprising: a lower redirection member rotatable in yaw and movable vertically relative to the upper conveyor, the lower redirection member located below the upper conveyor and configured to receive and redirect the bulk material from the upper conveyor toward the lower conveyor.

In accordance with another aspect of the present invention, there is provided a material transition assembly for directing bulk material from an upper conveyor to a lower conveyor, the upper conveyor and lower conveyor being relatively rotatable in yaw and the lower conveyor being pivotable in pitch, the material transition assembly comprising: a bottom containment assembly movable lengthwise relative to the lower conveyor, the bottom containment assembly pivotable in pitch and movable vertically relative to the upper conveyor, the bottom containment assembly including an aperture formed therein for passing the bulk material to the lower conveyor.

BRIEF DESCRIPTION OF THE FIGURES

These and other features of the invention will become more apparent in the following detailed description in which reference is made to the appended drawings.

DETAILED DESCRIPTION OF THE INVENTION

Definitions

Figure 1:
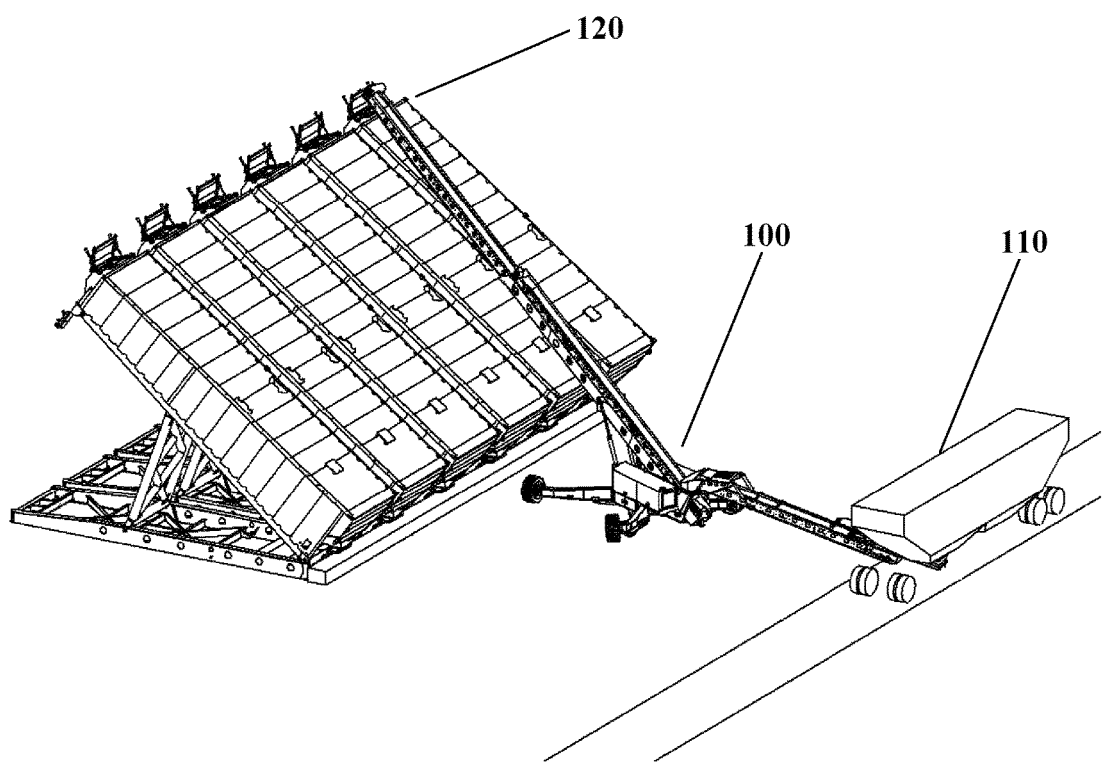
FIG. 1 illustrates a bulk material delivery, handling and storage system comprising a mobile conveyor vehicle provided in accordance with an embodiment of the invention.

As used herein, the term "about" refers to a +/−10% variation from the nominal value. It is to be understood that such a variation is always included in a given value provided herein, whether or not it is specifically referred to.

As used herein, the term "cone" typically refers to a structure having a frustro-conical funnel shaped interior aperture.

Unless defined otherwise, all technical and scientific terms used herein have the same meaning as commonly understood by one of ordinary skill in the art to which this invention belongs.

Embodiments of the present invention generally relates to a conveyor vehicle for transporting bulk material, such as sand, proppant, or the like. The vehicle includes a system of conveyors for transporting the material.

An aspect of the present invention provides for a material transition assembly for directing bulk material from an upper conveyor to a lower conveyor. The upper conveyor and lower conveyor are relatively rotatable in yaw and the lower conveyor is pivotable in pitch. The material transition assembly includes an upper hood portion, a lower redirection member, and a bottom containment assembly. The upper hood portion is configured to receive the bulk material from the upper conveyor and to redirect the bulk material downward through an upper exit aperture toward the lower conveyor. The lower redirection member is disposed underneath the upper hood portion, is rotatable in yaw relative to the upper hood portion, and is movable vertically relative to the upper hood portion. The lower redirection member is configured to receive and redirect the bulk material from the upper exit aperture toward the lower conveyor. The lower redirection member may be fixed in pitch relative to the vehicle. The lower redirection member may be a vertically oriented body having sidewalls curved into a partial cone shape as described herein, although other shapes are also possible. The bottom containment assembly is mounted to the lower conveyor and is movable lengthwise relative to the lower conveyor. The bottom containment assembly is pivotable and movable vertically relative to the upper hood portion, and includes an aperture formed therein for receiving the bulk material, thus allowing the bulk material to flow from the lower redirection member to the lower conveyor.

Embodiments of the present invention address the issue of material flow transition between a pair of conveyors. A bulk material, such as sand, is handled in such a way that it falls off of the end of an upper conveyor and is directed downward toward a lower conveyor, with the flow of the bulk material being controlled during the transition.

Embodiments of the present invention address the issue of material flow transition between a pair of conveyors, such as belt conveyors, that are relatively rotatable in the yaw direction, such that the upper conveyor conveys material toward the transition in a first direction, the lower conveyor conveys material away from the transition in a second direction, and the first and second directions potentially have different horizontal components. In various embodiments, the transition apparatus comprises a rotatable turret having a base portion mounted to the lower conveyor and an upper portion attached to the upper conveyor, with the base portion and upper portion being rotatably coupled to one another. The flow of material may be redirected within the interior of the turret.

Embodiments of the present invention address the issue of material flow transition between a pair of conveyors that are relatively rotatable in the pitch direction. For example, as the lower conveyer is raised or lowered in pitch, the location of the lower conveyor onto which the bulk material flows may be varied. This may be accomplished by rollably or slidably mounting the bottom containment assembly to the lower conveyor. This allows the material transition assembly to remain horizontally stationary as the lower conveyor is adjusted in pitch.

FIG. 1 illustrates a bulk material delivery, handling and storage system comprising a mobile conveyor vehicle provided in accordance with one embodiment of the invention. The system includes a mobile conveyor vehicle 100 which receives bulk material from a hopper underneath a source vehicle 110 and elevates the material to a bulk storage bin 120 by means of a pair of relatively rotatable and telescoping conveyors.

Figure 2:
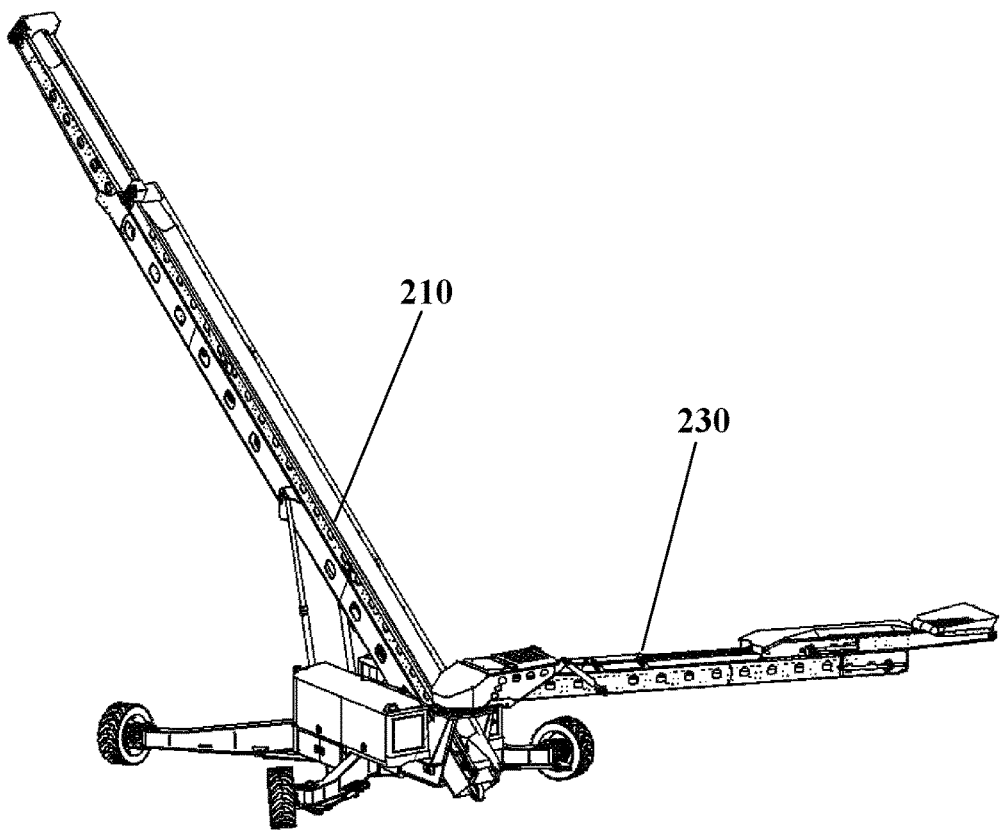
FIG. 2 illustrates a conveyor vehicle provided in accordance with an embodiment of the invention.

FIG. 2 illustrates a conveyor vehicle provided in accordance with one embodiment of the invention. The vehicle comprises an upper infeed conveyor 230 which dispenses material downward onto a lower output conveyor 210. The infeed and output conveyors are relatively rotatable in the yaw and pitch direction by the use of mechanical devices such as motors, hydraulic actuators, or alternatively by manual manipulation.

Figure 3:
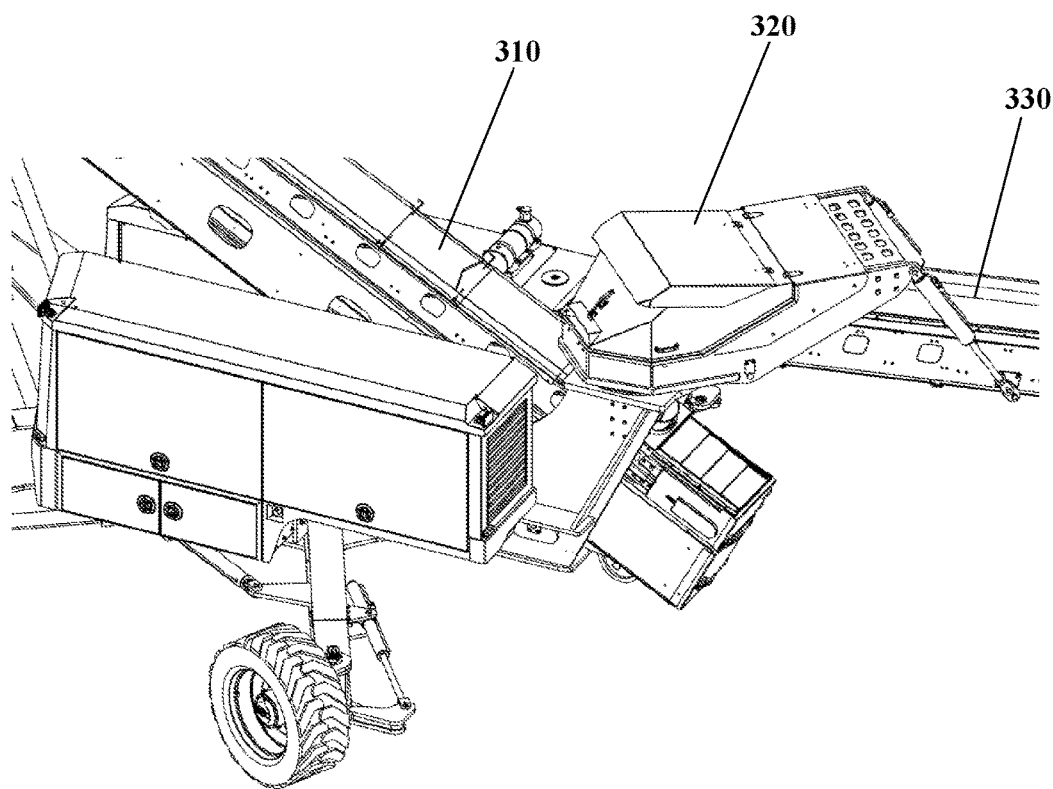
FIG. 3 illustrates a conveyor-to-conveyor material transition assembly in accordance with an embodiment of the invention.

FIG. 3 illustrates a close-up view of the material flow transition assembly portion of a conveyor vehicle provided in accordance with an embodiment of the present invention. The upper conveyor 330, lower conveyor 310, and material transition assembly 320 are identified. The material flow transition assembly receives material from the upper conveyor and redirects it toward the lower conveyor.

Material Flow Transition

Embodiments of the present invention provide a material flow transition assembly for facilitating the flow of material from an upper conveyor to a lower conveyor. In various embodiments, the material flow transition assembly comprises an upper hood portion, a lower redirection member, and a bottom containment assembly.

Figure 4:
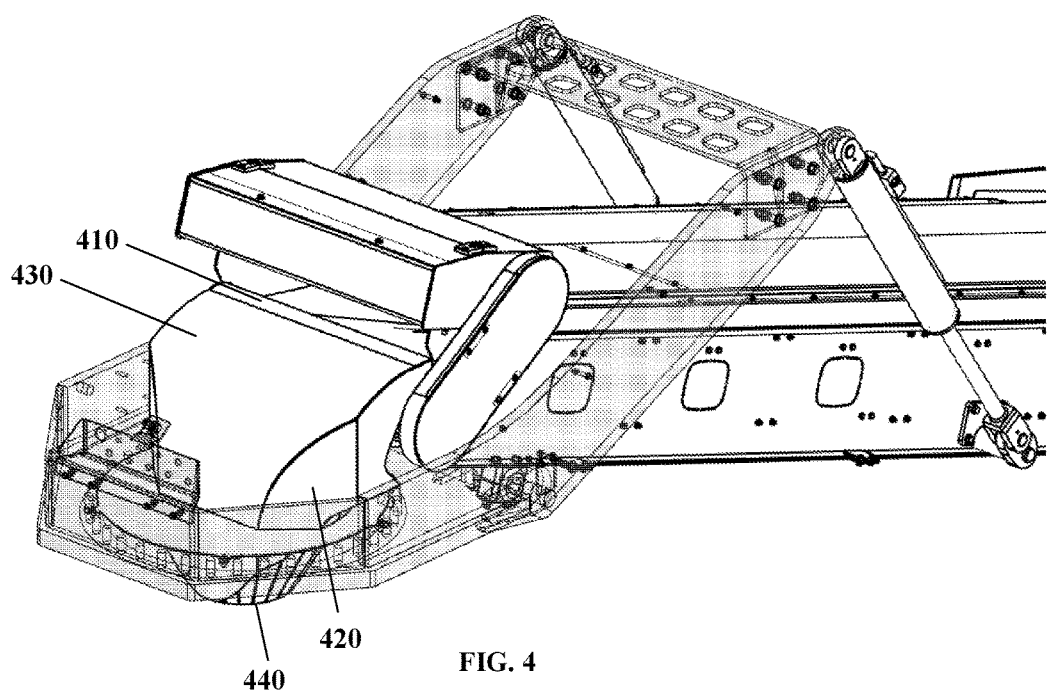
FIG. 4 illustrates an upper hood portion of the material transition assembly, in accordance with an embodiment of the invention.

FIG. 4 illustrates an upper hood portion of the material transition assembly mounted at an end of the upper conveyor, in accordance with an embodiment of the invention. As illustrated, the upper hood portion includes a material input aperture (not visible but proximate to a top region 410), inwardly angled sidewalls 420 and a curved flat back 430. A cone-shaped lower redirection member 440 is also illustrated. The material input aperture extends in the vertical direction and receives material from the upper conveyor. The upper hood portion redirects the material downward to the lower redirection member 440, which in turn redirects the material onward toward the lower conveyor. The material input aperture may be rectangular.

The upper hood portion may provide a substantially gradual transition in the size and/or shape of the channel through which material flows, with the material input aperture being larger than the upper exit aperture. The gradual decrease in channel size may allow for some accumulation of bulk material within the upper hood portion, thereby providing a hopper or funneling function which may concentrate the flow, regulate flow rate and limit exit flow rate of the bulk material, for example. Additionally or alternatively, the lower redirection member and aperture of the bottom containment assembly may provide for the gradual reduction in channel size, in which case material accumulation may occur at least in part in the lower portion of the material transfer assembly. An accumulation of material may be desirable to provide a cushioning or buffering effect when receiving further material onto the accumulation.

In some embodiments, the upwardly angled and inwardly curved inner sidewall of the lower redirection member presents a lower surface for holding the bulk material. The bulk material slides on the lower surface as it progresses toward the lower conveyor. Due to the inward curvature and conical shape, the lower surface has a progressively narrowing surface area. This helps to induce an accumulation of the bulk material resting on the lower conveyor.

In some embodiments, the upper exit aperture which provides fluidic communication between the upper hood portion and the lower redirection member may include a frustro-conical shaped channel.

In one embodiment, because a downstream aperture is smaller than an upstream aperture, a buffer of material can accumulate within the transition assembly when material is fed into the transition assembly at a particular rate. Upstream components such as the input conveyor can be controlled so as to establish and maintain such a buffer of material at a desired amount. The buffer of material can be used to assist in regulating the flow of material from the transition assembly, for example so that the material is output with a desired shape and velocity. As material reaches the buffer, it is slowed, and material exits the buffer at a rate, shape and direction that are primarily dictated by the shape of the material channel in the vicinity of the buffer of material.

A frustro-conically shaped channel portion may be used to direct the material into a generally cohesive stream with limited cross section. The frustro-conical shape may, by virtue of its aperture size, serve to limit the material flow speed. Limiting material speed may facilitate a smoother material flow downstream, for example.

The upper hood portion is configured to direct the material flow downwards and to contain the material in a sized opening such that the material flow exits with a desired shape. The input aperture captures the material from the upper conveyor. The material flow is then narrowed and directed downwards using the angled sides and the curved flat back. As material impacts these features within the interior of the upper hood portion, it is redirected in a desired manner toward the upper exit aperture.

The curved flat back is configured to redirect the material as received from the upper conveyor. The curved flat back includes a curved inner surface located in the path of the material flow for redirection thereof. The curvature may be configured such that the material is redirected with limited turbulence, and for a range of pitch angles and/or material exit speeds of the upper conveyor, which may be pivotable in the pitch direction relative to the upper hood portion.

Operationally, the bulk material acts as a fluid being moved through the system of conveyors and through the transition region. The material has a momentum, and therefore changes of direction at the transition region require a certain amount of force to be exerted upon the material. The interior sidewalls of the transition assembly are placed in the material flow path to contact the material and impart such a force. As such, as bulk material moves off of the upper conveyor it initially moves in an arc, until at least some of the material encounters and is redirected by the curved flat back of the upper hood portion. The material is directed downward by the curved flat back and angled sides.

Figure 5A:
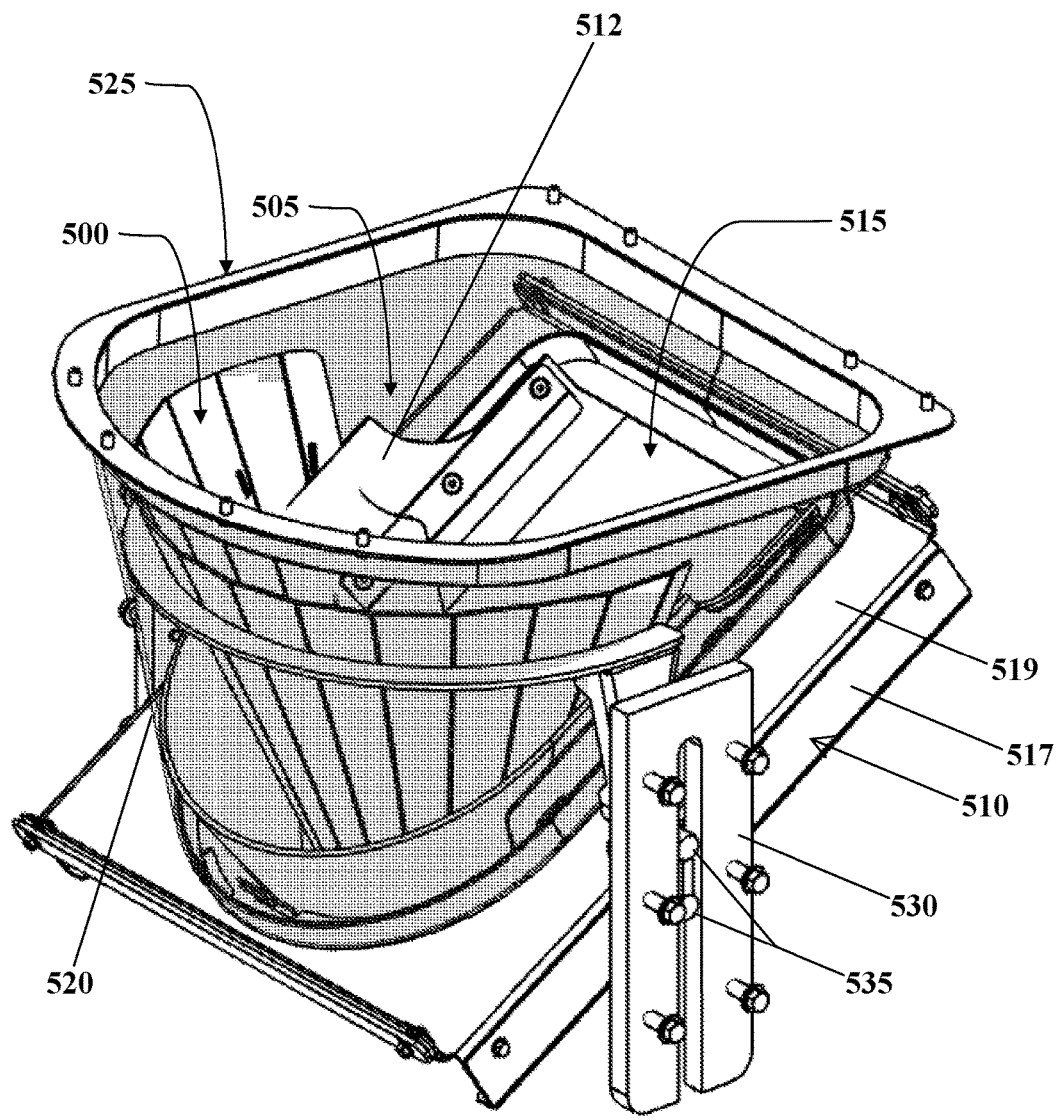
FIGS. 5A and 5B illustrates a lower redirection member and bottom containment assembly of the material transition assembly, in accordance with an embodiment of the invention.
Figure 5B:
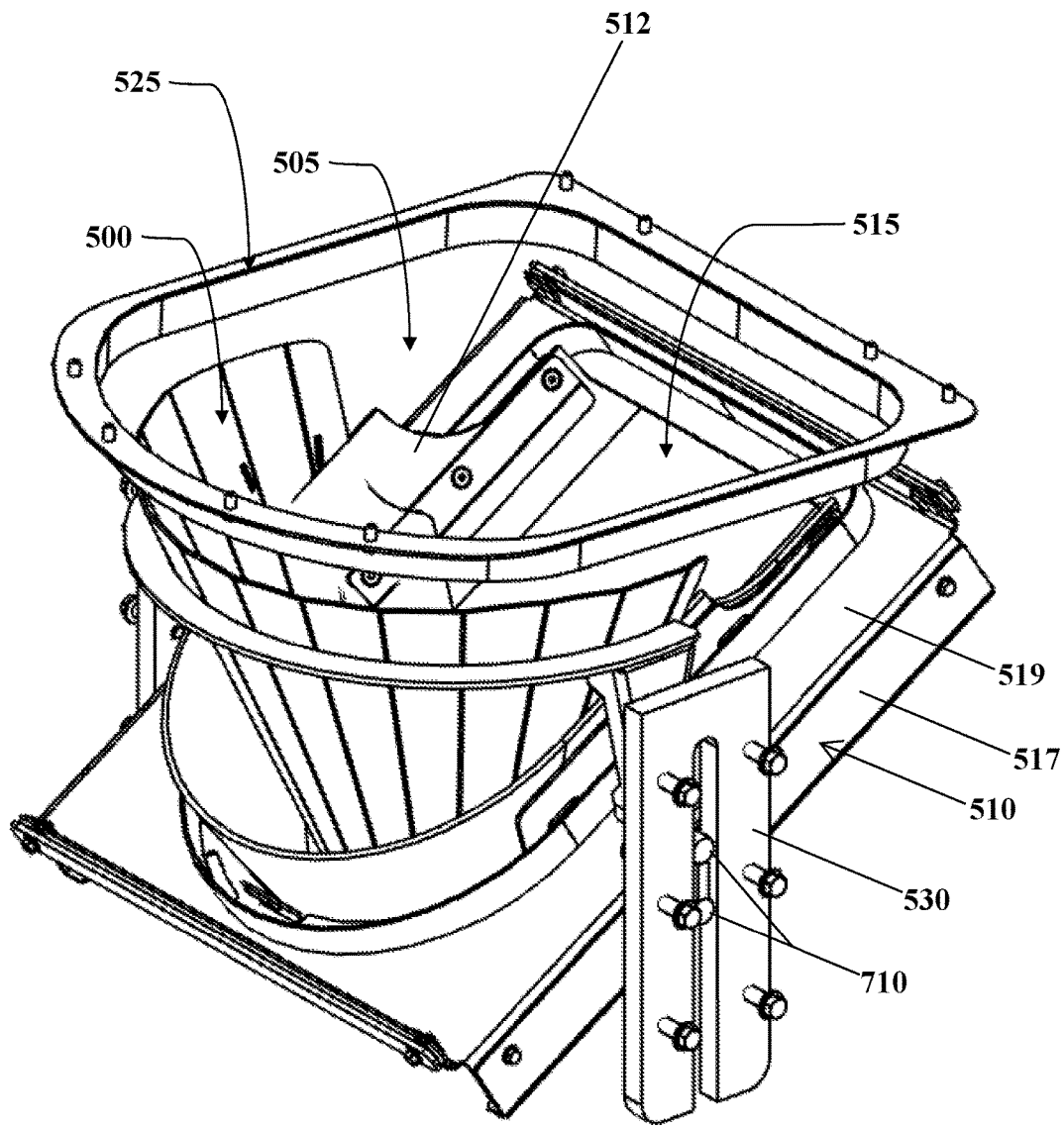

FIGS. 5A and 5B illustrates a portion of the material transition assembly including the lower redirection member 500 and bottom containment assembly 510, in accordance with an embodiment of the invention. The lower redirection member is located below the upper hood portion such that the upper exit aperture of the upper hood portion is aligned for feeding material into the lower redirection member. The lower redirection member is rotatable in the yaw direction relative to the upper hood portion. For example, the upper hood portion may be contained within the upper portion of a hollow turret, and the lower redirection member may be contained within the lower portion of the turret. The lower redirection member is configured to maintain the generally vertical flow of the material as it travels from the upper hood portion toward the lower conveyor. The lower redirection member may be configured to inhibit scattering of the bulk material as it exits the upper hood portion. The lower redirection member assists in maintaining the vertical direction of the material flow and to direct the flow in the direction of the lower conveyor.

As illustrated, the lower redirection member is defined by a sidewall which is angled upward and curved inward. This shape resembles a partial sidewall of a hollow frustro-conical shape, and for simplicity is referred to as a cone shape.

As illustrated, the lower redirection member does not extend completely in the circumferential direction but rather includes an open side 505. The open side faces the direction of material flow on the lower conveyor. The angles of the lower redirection member sidewalls directs material toward the center of the lower conveyor and along the direction of motion of the lower conveyor, while also tending to impart an upward component to motion of material bouncing off of the cone sidewalls, due to the upward angle of the sidewalls. In some embodiments, the sidewalls of the lower redirection member may extend about 180 degrees in the circumferential direction. As the lower conveyor is raised in the pitch direction, the slope of the lower conveyor is compensated for with the slope of the lower redirection member.

In various embodiments, the slope and shape of the lower redirection member is configured to cause and/or allow for a buildup of bulk material under a certain range of material flow rates. As the bulk material held by sidewalls of the lower redirection member builds up, a structure of bulk material is formed, substantially sealed to the lower conveyor. The structure of bulk material can rest against the lower redirection member and slope downward toward the lower conveyor, for example. This structure of bulk material provides a cushion for subsequent material received into the lower redirection member. This may reduce scatter of further bulk material when received downward onto the buildup of bulk material.

In various embodiments, the lower redirection member with open sidewall allows the material to be substantially unobstructed when moving in the direction of the flow. Directions of flow may include a direction along a first vector pointed toward the lower conveyor, a direction along a second vector pointed in the direction of motion of the lower conveyor, and directions along a vector which is a convex combination of the first vector and the second vector. Thus, material can flow from the upper hood assembly toward the aperture in the bottom containment assembly in a variety of direct and/or indirect paths.

FIGS. 5A and 5B further illustrates a bottom containment assembly 510, which is configured to help control the flow of material in the direction of the lower conveyor. The bottom containment assembly is a rectangular body which fits over a portion of the lower conveyor, and includes an aperture 515 for receiving bulk material. A bottom section of the lower redirection member may be disposed overtop of or within the aperture 515, depending on the vertical position of the lower redirection member. The lower redirection member directs material toward the aperture 515 for example due to the curved sidewalls. The aperture 515 may include an elongated section which extends from the open side of the lower redirection member along the direction of travel of the lower conveyor. As such, bulk material travelling generally toward the lower conveyor and along the direction of the lower conveyor can be received by the lower conveyor through the bottom containment assembly aperture.

The bottom containment assembly includes sidewalls 517 and a top wall portion 519 which assist in containing the bulk material within a space defined between the lower conveyor and the bottom containment assembly. The top wall portion surrounds the aperture, while the sidewalls extend downward toward the lower conveyor.

The bottom containment assembly is pivotable relative to the lower redirection member and may not be directly affixed to the lower redirection member. In some embodiments, the bottom containment assembly and lower redirection member are pivotably connected.

The bottom containment assembly may include an extension 512 which protrudes from sidewalls of the aperture 515 and substantially contacts the curved sidewalls of the lower redirection member. The extension 512 may slidingly or wipingly engage the curved sidewalls, and may be made of a flexible and resilient material such as rubber. The extension 512 functions to contain the material flow while allowing pivoting movement between the lower redirection member and the bottom containment assembly.

In various embodiments, the shape of the bottom containment assembly is derived from the moving lower redirection member and the free exit of material. As the various components of the material transition assembly are movable relative to one another, the shapes allow containment of the material flow for a variety of relative yaw and pitch positions of the upper and lower conveyors.

In various embodiments, the bottom containment assembly is configured to movably engage the lower conveyor by slideably or rollably mounting the bottom containment assembly to the housing of the lower conveyor, such that the bottom containment assembly can move lengthwise relative to the lower conveyor while remaining attached thereto. A track mounting system may be used, for example. This may facilitate pivoting of the lower conveyor in the pitch direction while keeping the material transition assembly in place.

FIG. 5A further illustrates a shroud 520, for example made of flexible rubber, metal chains, mesh, or the like. The shroud may be provided surrounding the lower redirection member, the aperture of the bottom containment assembly, and extends upward toward the upper hood portion. The shroud serves to surround the material flow and to assist in containing material and dust within the material transition assembly. The shroud is removed in FIG. 5B for clarity. In various embodiments, the bottom containment assembly operates as a lower anchor for the shroud 520, while a bottom part 525 of the upper portion of the turret operates as an upper anchor for the shroud.

FIGS. 5A and 5B further illustrates a slotted guide plate 530 which is affixed to a portion of the material handling vehicle that does not tilt in the pitch direction with the lower conveyor, and which does not pivot in the yaw direction with the upper conveyor. One or more guide members 710 are slideably engaged within the slot of the guide plate, the guide members being affixed to the lower redirection member. The guide plate and guide members serve to maintain horizontal positioning of parts of the material transition assembly, while allowing vertical movement thereof. The vertical movement allows part of the material transition assembly to move upward or downward to accommodate pitch pivoting of the lower conveyor, while maintaining closeness of the lower redirection member to the lower conveyor. The closeness of the lower redirection member to the lower conveyor may facilitate providing a cushion or buffer of bulk material resting on the lower conveyor and supported on one side by the lower redirection member. This cushion may function to smooth the transition of bulk material onto the lower conveyor. By using multiple guide members 710 or alternatively an elongated guide member, a fixed pitch of the lower redirection member can be maintained.

Rotating Turret

Embodiments of the present invention provide a rotating turret, for facilitating the relative rotation in the yaw direction of the upper and lower conveyors. The rotating turret has a base portion and an upper portion rotatably coupled thereto. The rotating turret contains the material flow transition assembly. The upper portion of the turret contains the upper hood portion of the material transition assembly while the lower portion of the turret contains the lower redirection member of the material transition assembly. As such the upper hood portion and material flow cone may also be relatively rotatable in the yaw direction.

Figure 6:
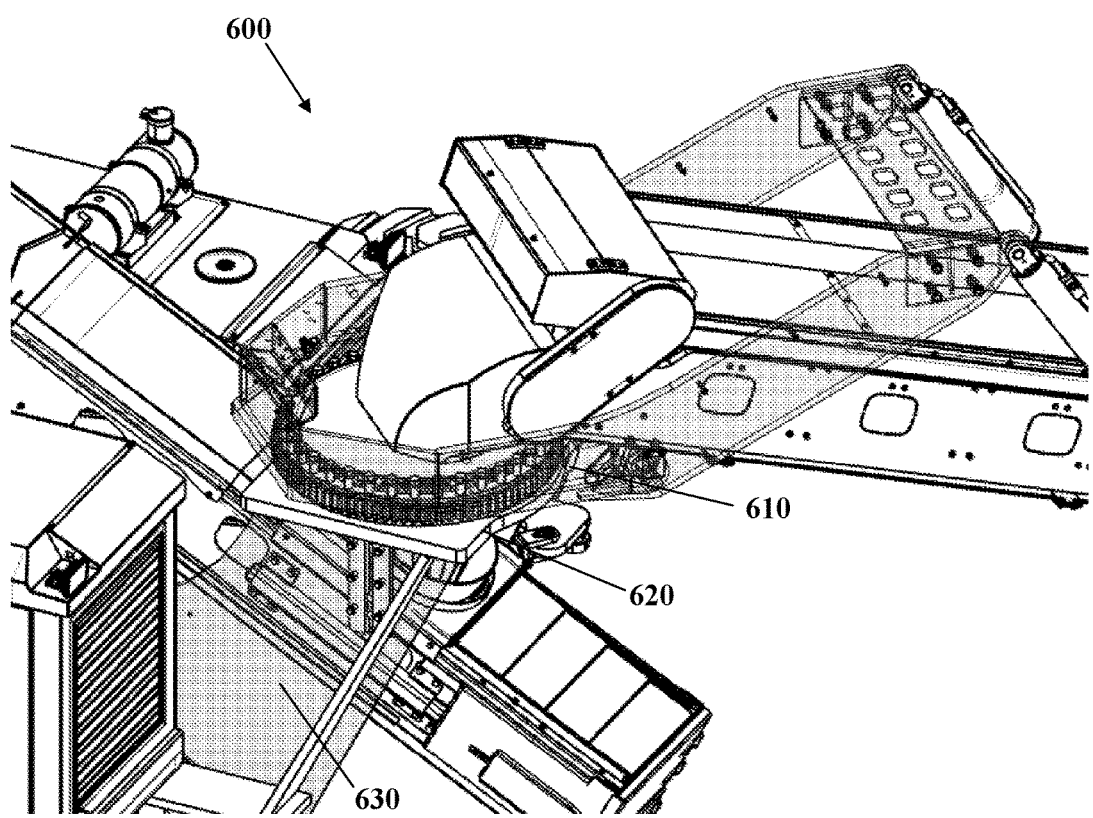
FIG. 6 illustrates yaw rotation of a turret and material transition assembly in accordance with an embodiment of the present invention.

FIG. 6 illustrates the rotating turret 600 in accordance with an embodiment of the present invention. The upper portion 610 of the rotating turret rotates in yaw with the upper conveyor and the upper hood portion, while the lower portion 620 of the rotating turret is co-oriented with the lower conveyor, the lower redirection member, and the bottom containment assembly. In some embodiments, the rotating turret may form a housing overtop of various portions of the material transition assembly.

FIG. 6 further illustrates a chassis upright 630 to which one of the slotted guide plates of FIG. 5 is connected. Another parallel chassis upright is located on the opposite side of the vehicle for holding the other slotted guide plate.

In various embodiments, the relative re-orientability of the upper and lower conveyors in the yaw and/or pitch directions results in a range of potential directions of material flow into and out of the material transition assembly. The rotatable turret supports this relative re-orientability. The shape of the various components of the material transition assembly are configured to handle material flow for this range of potential directions, thereby allowing flexibility in the directing the flow of material. Further, the three separate and relatively movable components of the material transition assembly may accommodate this flexibility in directing the flow of material from the upper conveyor to the lower conveyor.

Lower Conveyor Pitch Adjustment

In various embodiments, the lower conveyor may be pivoted vertically to adjust the pitch thereof. The lower conveyor may rotate on a pin and move in an arc. As such, the material transition assembly is configured to accommodate such pitch adjustments while maintaining its position relative to the upper conveyor. The material transition assembly may located away from the pivot point of the lower conveyor, or the material transition assembly may be located overtop of the pivot point. In either case, pivoting of the lower conveyor in pitch results in vertical travel of at least part of the lower conveyor directly under the material transition assembly.

Figure 7:
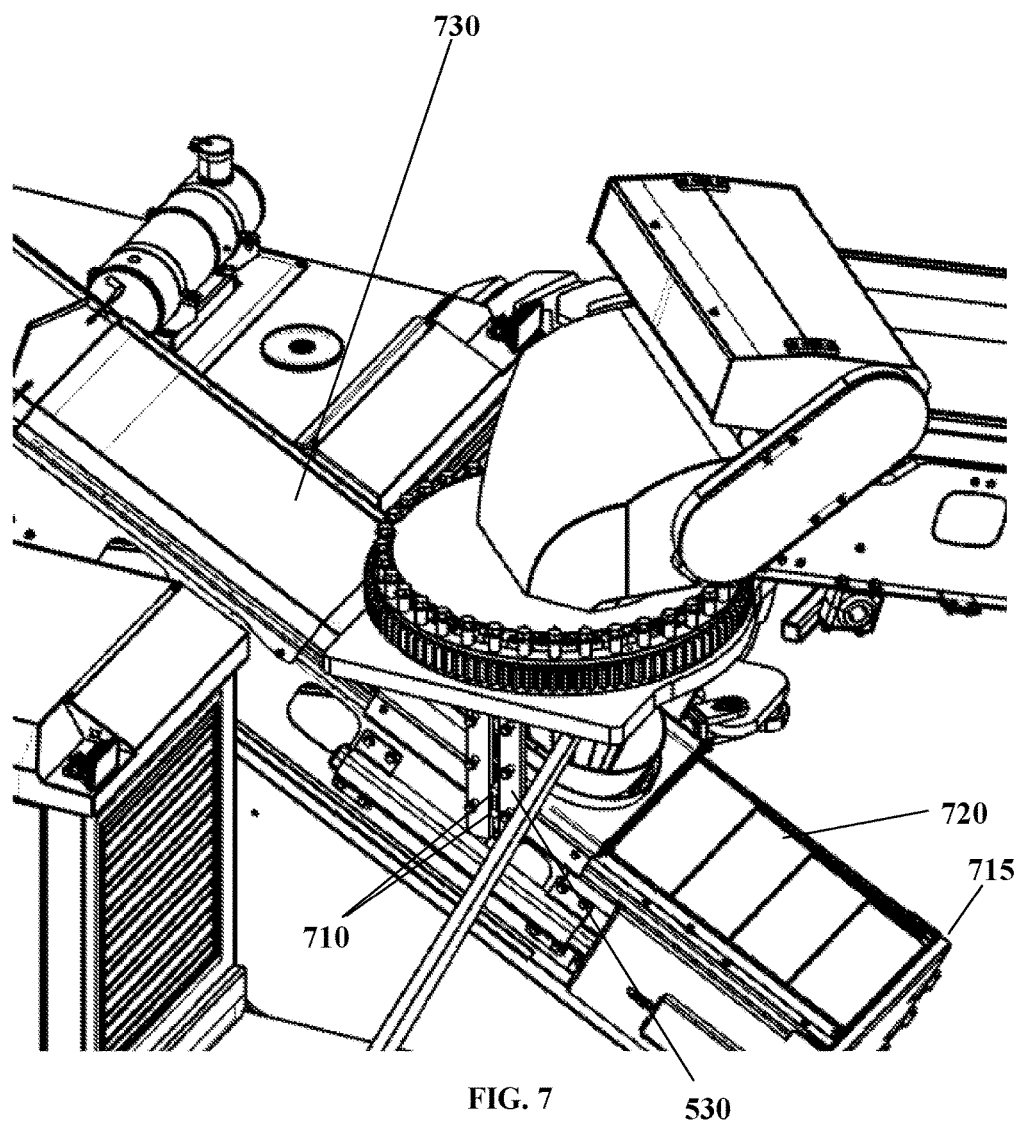
FIG. 7 illustrates components of the material transition assembly and conveyors in accordance with an embodiment of the present invention.

FIG. 7 illustrates components of the material transition assembly and conveyors in accordance with an embodiment of the present invention. FIG. 7 is similar to FIG. 6 except that the chassis upright is not shown for clarity. As the lower conveyor is pivoted in the pitch direction, portions of the lower conveyor directly under the material transition assembly moves upward or downward. To accommodate this vertical motion while maintaining a predetermined desired amount of separation between the lower conveyor and lower redirection member, the lower redirection member is configured to move vertically up and down. This vertical movement is achieved by the mounting of an extension flange of the lower redirection member to the slotted guide plates, so that the lower redirection member maintains its horizontal position relative to the material transition assembly while also being vertically movable. The desired amount of separation may be separation within a desired range of distances.

In more detail, the slotted guide plates 530, as attached to the chassis uprights, allow the lower redirection member to move up and down using a two-pin dowel setup. In this configuration, each of the two slotted guide plates accommodates two pins 710, both of which are rigidly attached to support the lower redirection member via the extension flange. Using two pins inhibits the lower redirection member from pivoting, thereby inhibiting changes in pitch and keeping the member in the vertical orientation. As an alternative to the two pins, an elongated body may be accommodated within each of the slotted guide plates.

Also as the lower conveyor is pivoted in the pitch direction, the portion of the lower conveyor directly under the material transition assembly shifts. To understand this, it is noted that the distance from the material transition assembly to the near end 715 of the lower conveyor, as measured within the plane of the lower conveyor, is shorter when the lower conveyor is horizontal than when the lower conveyor is raised at an angle. To accommodate the resulting horizontal component of movement of the lower conveyor relative to the material transition assembly, the bottom containment assembly is mounted to the lower conveyor in such a manner that the bottom containment assembly can move lengthwise relative to the lower conveyor while remaining attached thereto.

In the illustrated embodiment, such a mounting includes resting the bottom containment assembly on rails associated with sidewalls of the lower conveyor, so that the bottom containment assembly is movable on the rails, for example by sliding or by rolling on suitably provided wheels or roller bearings. The rails may correspond to existing flanges of the lower conveyor support structure, or the rails may be provided as an additional feature mounted to the sides of the lower conveyor.

Figure 8:
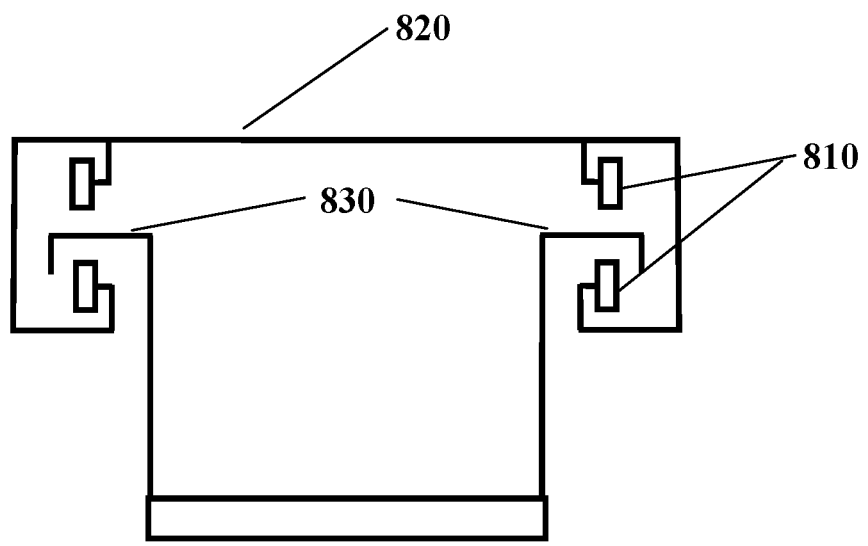
FIG. 8 illustrates mounting of the bottom containment assembly to the lower conveyor, in accordance with an embodiment of the invention.

FIG. 8 conceptually illustrates a rail mounting configuration in accordance with one embodiment. Wheels or bearings 810 may be mounted as also illustrated in FIG. 8. A lower surface of the bottom containment assembly 820, or wheels mounted thereto, may rest on the rails 830 of the lower conveyor support structure. As illustrated, additional side brackets may be attached which wrap around and hook to the underside of the top of the rails. The side brackets may assist in keeping the bottom containment assembly loosely captured to the rail rather than being pulled vertically away from the rail for example when the lower conveyor is pivoted downward.

To maintain the vertical alignment of the bottom containment assembly with the material transition assembly, a bracket may be provided, which is connected at one end to the bottom containment assembly and which is pivotably connected at another end to another structure which is fixed horizontally, but not necessarily vertically, relative to the material transition assembly. For example, one end of the bracket may include a pin which is movable within the slot of the guide plate which also guides the lower redirection member. As another example, one end of the bracket may be pivotably connected to the structure which connects the lower redirection member to the guide pins inserted in the slot of the guide plate. A pair of brackets on opposite sides of the bottom containment assembly may be provided.

FIG. 7 further illustrates telescoping/sliding covers 720, 730 on opposite sides of the bottom containment assembly, to cover portions of the conveyor adjacent to the bottom containment assembly. The system of telescoping/sliding covers and the bottom containment assembly can cooperate to substantially cover the lower conveyor except around the shrouded opening at which material is received from the material transition assembly to the lower conveyor. The telescoping/sliding covers slide laterally to accommodate lateral motion of the bottom containment assembly relative to the lower conveyor, that is, so as to not impede the ability of the bottom containment assembly to move laterally. Telescoping may be achieved by providing different sliding cover sections, some of which can slide overtop of others when required. The illustrated upper sliding cover section 730 may be a two component assembly, while the illustrated lower sliding cover section 720 may include multiple components which are collapsible one overtop of another in a telescoping fashion. Each component of the upper and lower sliding cover section may be rail-mounted to the lower conveyor in a manner similar to the mounting of the bottom containment assembly.

As noted above, embodiments of the present invention provide a system of telescoping/sliding covers along with a bottom containment assembly mounted to the lower conveyor which is movable lengthwise relative to the lower conveyor, in order to accommodate pitch tilting of the lower conveyor while keeping the bottom containment assembly in place. To this end, the covers and bottom containment assembly may be rail-mounted to the lower conveyor, for example. However, it is recognized herein that such a configuration may also be used more generally to provide an aperture for receiving material onto the lower conveyor which is moveable laterally along the lower conveyor for a variety of purposes. For example, embodiments of the present invention provide for a telescoping system of covers which are slideably or rollably mounted to a conveyor, one of the covers having an aperture therein for receiving bulk material. The system of covers are telescoping in the sense that some covers are slideable over other covers. The system of covers may be interlocked to avoid the occurrence of gaps between covers. The cumulative length of the system of covers is greater than the length of the conveyor, so that the cover having the aperture can be placed in a range of positions.

It is noted that, although illustrated embodiments of the present invention relate to a material flow transition assembly that includes all three of an upper hood portion, a lower redirection member, and a bottom containment assembly, other embodiments may be directed toward each of these components individually or in sub-combination. For example, some embodiments omit the upper hood portion, with the lower redirection member receiving material directly from the upper conveyor and movable vertically and in yaw relative to the upper conveyor. As another example, the bottom containment assembly may be omitted or non-movable lengthwise relative to the lower conveyor. As another example, the bottom containment assembly may be provided without the lower redirection member, instead receiving bulk material via another source.

It should be readily appreciated that, although embodiments of the present invention relate to a conveyor-to-conveyor transition for a mobile material handling vehicle, other embodiments of the present invention may provide a transition apparatus for use in other applications. For example, the present invention may be applied to conveyor-to-conveyor transition in stationary conveyor systems. As another example, one or both of the conveyors may be replaced with other material handling components, such as gravity-fed storage containers, storage areas serviced by material pushing vehicles or manual material moving personnel, or the like.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A material transition assembly for directing bulk material from an upper conveyor to a lower conveyor, the upper conveyor and lower conveyor being relatively rotatable in yaw and the lower conveyor being pivotable in pitch, the material transition assembly comprising:
    a lower redirection member rotatable in yaw and movable vertically relative to the upper conveyor, the lower redirection member configured to receive and redirect the bulk material from the upper conveyor; and
    a bottom containment assembly movable lengthwise relative to the lower conveyor, the bottom containment assembly pivotable in pitch with the lower conveyor, the bottom containment assembly including an aperture formed therein for passing the bulk material from the lower redirection member to the lower conveyor.

2. The material transition assembly of claim 1, further comprising an upper hood portion configured to receive the bulk material from the upper conveyor and to redirect the bulk material downward to the lower redirection member, the upper hood portion rotatable in yaw relative to the lower redirection member.

3. The material transition assembly according to claim 2, wherein the upper hood portion includes a downwardly curved wall portion configured to interrupt and redirect the bulk material.

4. The material transition assembly according to claim 2, wherein the upper hood portion defines an inner channel having a gradual transition in size, shape, or both.

5. The material transition assembly according to claim 2, wherein the upper hood portion defines an inner channel having a gradually decreasing cross-sectional area.

6. The material transition assembly according to claim 2, further comprising a flexible shroud anchored to the upper hood portion and to the bottom containment assembly, the shroud surrounding at least the lower redirection member.

7. The material transition assembly according to claim 1, wherein the lower redirection member is mounted in a fixed-pitch configuration.

8. The material transition assembly according to claim 1, wherein the lower redirection member includes an inwardly curved and upwardly angled inner sidewall.

9. The material transition assembly according to claim 8, wherein the inner sidewall is configured to present a lower surface for holding the bulk material, the lower surface having a progressively narrowing surface area, thereby inducing the accumulation of the bulk material.

10. The material transition assembly according to claim 1, wherein the lower redirection member includes a sidewall opposite a gap, the gap being adjacent to the aperture of the bottom containment assembly.

11. The material transition assembly according to claim 1, wherein the lower redirection member is configured, in response to a change in pitch of the lower conveyor, to move vertically to maintain a desired amount of separation between the lower redirection member and the lower conveyor.

12. The material transition assembly according to claim 1, wherein the bottom containment assembly is slideably or rollably mounted to the lower conveyor.

13. The material transition assembly according to claim 1, wherein the bottom containment assembly includes one or more sidewall portions, top wall portions, or both, for containment of the bulk material adjacent to the lower conveyor.

14. The material transition assembly according to claim 1, further comprising an extension protruding from sidewalls of the aperture of the bottom containment assembly, the extension wipingly engaging inner sidewalls of the lower redirection member for containing the bulk material.

15. The material transition assembly according to claim 1, wherein the lower redirection member and the bottom containment assembly are configured to induce and maintain an accumulation of the bulk material supported on the lower conveyor, said accumulation of the bulk material aligned with flow of the bulk material received by the lower redirection member, thereby cushioning receipt of further bulk material.

16. A method for directing bulk material from an upper conveyor to a lower conveyor, the upper conveyor and lower conveyor being relatively rotatable in yaw and the lower conveyor being pivotable in pitch, the method comprising:
receiving the bulk material at a lower redirection member disposed lower than the upper conveyor, the lower redirection member being rotatable in yaw and movable vertically relative to the upper conveyor;
redirecting the bulk material using the lower redirection member toward an aperture formed in a bottom containment assembly;
receiving the bulk material through the aperture in the bottom containment assembly; and
containing the bulk material adjacent to the lower conveyor using the bottom containment assembly.

17. The method of claim 16, further comprising:
receiving the bulk material within an upper hood portion defining a channel for the bulk material, the upper hood portion rotatable in yaw relative to the lower redirection member; and
redirecting the bulk material downward within the upper hood portion toward the lower redirection member.

18. The method of claim 16, further comprising, in response to pivoting of the lower conveyor in pitch, moving the lower redirection member vertically while retaining a pitch of the lower redirection member, and moving the bottom containment assembly along a length of the lower conveyor while allowing the bottom containment assembly to pivot in pitch to maintain position overtop of the lower conveyor.

19. The method of claim 16, further comprising inducing and maintaining an accumulation of the bulk material supported on the lower conveyor, said accumulation of the bulk material aligned with flow of the bulk material to the lower redirection member, thereby cushioning receipt of further bulk material.

20. A material transition assembly for directing bulk material from an upper conveyor to a lower conveyor, the upper conveyor and lower conveyor being relatively rotatable in yaw and the lower conveyor being pivotable in pitch, the material transition assembly comprising:
a lower redirection member rotatable in yaw and movable vertically relative to the upper conveyor, the lower redirection member located below the upper conveyor and configured to receive and redirect the bulk material from the upper conveyor toward the lower conveyor, wherein the lower redirection member is configured, in response to a change in pitch of the lower conveyor, to move vertically in its entirety to maintain a desired amount of separation between the lower redirection member and the lower conveyor.

21. A material transition assembly for directing bulk material from an upper conveyor to a lower conveyor, the upper conveyor and lower conveyor being relatively rotatable in yaw and the lower conveyor being pivotable in pitch, the material transition assembly comprising:
a bottom containment assembly movable lengthwise relative to the lower conveyor, the bottom containment assembly pivotable in pitch and movable vertically relative to the upper conveyor, the bottom containment assembly including an aperture formed therein for passing the bulk material to the lower conveyor, wherein the bottom containment assembly is movably mounted to the lower conveyor.

22. The material transition assembly of claim 21, wherein the bottom containment assembly includes a top wall portion configured to contain the bulk material within a space defined between the lower conveyor and the bottom container assembly.

* * * * *